US008338319B2

(12) United States Patent
McGinnis et al.

(10) Patent No.: US 8,338,319 B2
(45) Date of Patent: *Dec. 25, 2012

(54) COMPOSITION FOR HIGH PERFORMANCE GLASS FIBERS AND FIBERS FORMED THEREWITH

(75) Inventors: Peter Bernard McGinnis, Gahanna, OH (US); Douglas A. Hofmann, Hebron, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 218 days.

This patent is subject to a terminal disclaimer.

(21) Appl. No.: 12/341,985

(22) Filed: Dec. 22, 2008

(65) Prior Publication Data

US 2010/0160139 A1  Jun. 24, 2010

(51) Int. Cl.
C03C 13/06 (2006.01)
C03C 13/00 (2006.01)
C03C 3/085 (2006.01)

(52) U.S. Cl. .............................. 501/36; 501/35; 501/69

(58) Field of Classification Search .................... 501/35, 501/36, 69
See application file for complete search history.

(56) References Cited

U.S. PATENT DOCUMENTS

| | | | |
|---|---|---|---|
| 3,044,888 A | 7/1961 | Provance |
| 3,189,471 A | 6/1965 | Thomas |
| 3,220,915 A | 11/1965 | Shannon |
| 3,360,386 A | 12/1967 | Kelley et al. |
| 3,402,055 A | 9/1968 | Harris et al. |
| 3,408,213 A | 10/1968 | Provance et al. |
| 3,484,259 A | 12/1969 | Lewis et al. |
| 3,498,805 A | 3/1970 | Stalego |
| 3,524,738 A | 8/1970 | Grubb et al. |
| 3,535,096 A | 10/1970 | Bour et al. |
| 3,709,705 A | 1/1973 | Hagedorn |
| 3,804,646 A | 4/1974 | Dumbaugh, Jr. |
| 3,833,388 A | 9/1974 | Ohlberg |
| 3,861,926 A | 1/1975 | Irlam et al. |
| 3,876,481 A | 4/1975 | Erickson et al. |
| 3,887,386 A | 6/1975 | Majumdar |
| 3,892,581 A | 7/1975 | Burgman et al. |
| 3,904,423 A | 9/1975 | Guthrie |
| 3,945,838 A | 3/1976 | Erickson et al. |
| 4,002,482 A | 1/1977 | Coenan |
| 4,012,131 A | 3/1977 | Krohn |
| 4,046,948 A | 9/1977 | Zlochower |
| 4,063,001 A | 12/1977 | Zlochower |
| 4,090,882 A | 5/1978 | Rauschenfels |
| 4,199,364 A | 4/1980 | Neely |
| 4,325,724 A | 4/1982 | Froberg |
| 4,366,251 A | 12/1982 | Rapp |
| 4,375,527 A | 3/1983 | Zahner |
| 4,386,164 A | 5/1983 | Moser |
| 4,491,951 A | 1/1985 | Dunn |
| 4,569,471 A | 2/1986 | Ingemansson |
| 4,582,748 A | 4/1986 | Eastes |
| 4,764,487 A | 8/1988 | Lewis |
| 4,824,806 A | 4/1989 | Yokoi et al. |
| 4,857,485 A | 8/1989 | Brennan et al. |
| 4,882,302 A | 11/1989 | Horiuchi et al. |
| 4,892,846 A | 1/1990 | Rogers et al. |
| 4,935,291 A | 6/1990 | Gunnink |
| 4,976,587 A | 12/1990 | Johnston et al. |
| 5,212,121 A | 5/1993 | Omata |
| 5,248,637 A | 9/1993 | Taneda et al. |
| 5,302,444 A * | 4/1994 | Jackson et al. ................. 428/426 |
| 5,332,699 A | 7/1994 | Olds et al. |
| 5,474,425 A | 12/1995 | Lawlor |
| 5,569,629 A | 10/1996 | TenEyck et al. |
| 5,576,252 A | 11/1996 | Rapp et al. |

(Continued)

FOREIGN PATENT DOCUMENTS

CA    2528923    12/2004

(Continued)

OTHER PUBLICATIONS

PCT Search Report PCT/US06/42406 dated Mar. 4, 2007. PCT Notification of Transmittal of the International Search Report and the Written Opinion of the International Searching Authority, or the Declaration, Application PCT/US06/42437 dated Apr. 30, 2007.
European Search Report, EP 06 82 7125 dated Dec. 10, 2008.
Conference paper by G. Fredell, "Fiber metal laminates for improved structural integrity," 1992.
Article by P. Joosee, "Literature search of mechanical properties of fiber-reinforced plastics for wind turbine rotors," Dec. 1988.
US Office Action, U.S. Appl. No. 11/267,739 dated Dec. 18, 2008.
US Office Action, U.S. Appl. No. 11/267,739 dated Sep. 24, 2008.
PCT Notification Concerning Transmittal of International Preliminary Report on Patentability, Application PCT/US06/042406 dated May 15, 2008.
PCT Notification of Transmittal of the International Search Report and the Written Opinion of the International Searching Authority, or the Declaration, Application PCT/US06/42406 dated May 8, 2007.
US Office Action, U.S. Appl. No. 11/267,702 dated Dec. 23, 2008.
US Office Action, U.S. Appl. No. 11/267,702 dated Sep. 24, 2008.
Thomson Scientific, London, GB; AN 1983-50368K Database WPI Week 198321, Apr. 16, 1983.

(Continued)

Primary Examiner — Karl Group
Assistant Examiner — Elizabeth A Bolden
(74) Attorney, Agent, or Firm — Calfee, Halter & Griswold LLP

(57) ABSTRACT

A composition for the manufacture of high strength glass fibers suitable for manufacture in a refractory lined glass melter is disclosed. The glass composition of the present invention includes 64-75 weight % $SiO_2$, 16-24 weight % $Al_2O_3$, 8-11 weight % MgO and 0.25 to 3.0 weight % $R_2O$ where $R_2O$ is the sum of $Li_2O$ and $Na_2O$. A composition of the present invention includes 64-75 weight % $SiO_2$, 16-24 weight % $Al_2O_3$, 8-11 weight % MgO and 0.25 to 3.0 weight % $Li_2O$. Another composition includes 68-69 weight percent $SiO_2$, 20-22 weight percent $Al_2O_3$, 9-10 weight percent MgO and 1-3 weight percent $Li_2O$. By using oxide based refractory lined furnaces the cost of production of glass fibers is substantially reduced in comparison with the cost of fibers using a platinum lined melting furnace. Fibers formed by the present invention are also disclosed. The fibers have a fiberizing temperature of less than 2650° F., a ΔT of at least 80° F. Further, the glass fibers have a strength in excess of 680 KPSI, in some instances a strength in excess of about 700 KPSI, and in others a strength in excess of about 730 KPSI. The glass fibers will desirably have a modulus greater than 12.0 MPSI, in some instances greater than about 12.18 MPSI, and in certain instances greater than about 12.7 MPSI.

20 Claims, No Drawings

U.S. PATENT DOCUMENTS

| | | | |
|---|---|---|---|
| 5,585,312 A | 12/1996 | TenEyck et al. | |
| 5,691,255 A | 11/1997 | Jensen et al. | |
| 5,719,092 A | 2/1998 | Arrington | |
| 5,789,329 A | 8/1998 | Eastes et al. | |
| 5,843,853 A | 12/1998 | Heitmann | |
| 5,851,932 A | 12/1998 | Dickson et al. | |
| 5,935,886 A | 8/1999 | Jensen et al. | |
| 5,948,535 A | 9/1999 | Chiurlo et al. | |
| 5,962,354 A | 10/1999 | Fyles et al. | |
| 5,997,977 A | 12/1999 | Zou et al. | |
| 6,063,470 A | 5/2000 | Zou et al. | |
| 6,069,100 A | 5/2000 | Naumann et al. | |
| 6,089,021 A | 7/2000 | Senandayake | |
| 6,101,847 A | 8/2000 | Shamp | |
| 6,136,735 A | 10/2000 | Gallo et al. | |
| 6,156,683 A | 12/2000 | Grove-Rasmussen et al. | |
| 6,169,047 B1 | 1/2001 | Nishizawa et al. | |
| 6,214,429 B1 | 4/2001 | Zou et al. | |
| 6,237,369 B1 | 5/2001 | LeBlanc et al. | |
| 6,248,678 B1 | 6/2001 | Pinckney | |
| 6,300,264 B1 * | 10/2001 | Ohara | 501/64 |
| 6,306,786 B1 | 10/2001 | Koyama et al. | |
| 6,314,760 B1 | 11/2001 | Chenoweth | |
| 6,329,310 B1 | 12/2001 | Peuchert et al. | |
| 6,358,873 B1 | 3/2002 | Stewart | |
| 6,376,403 B1 | 4/2002 | Koyama et al. | |
| 6,399,527 B1 | 6/2002 | Kishimoto et al. | |
| 6,403,676 B1 | 6/2002 | Jia et al. | |
| 6,422,041 B1 | 7/2002 | Simpson et al. | |
| 6,451,720 B1 | 9/2002 | Kishimoto | |
| 6,457,943 B1 | 10/2002 | Olsen et al. | |
| 6,458,436 B1 | 10/2002 | Hansen et al. | |
| 6,496,706 B1 | 12/2002 | Jon et al. | |
| 6,540,508 B1 | 4/2003 | Simpson et al. | |
| 6,579,599 B1 | 6/2003 | Blum et al. | |
| 6,686,304 B1 | 2/2004 | Wallenberger | |
| 6,794,322 B2 | 9/2004 | Sircar | |
| 6,809,050 B1 | 10/2004 | McGinnis | |
| 6,818,575 B2 | 11/2004 | Wallenberger | |
| 6,867,158 B2 | 3/2005 | Peuchert | |
| 6,933,045 B2 | 8/2005 | Tamura | |
| 6,933,252 B2 | 8/2005 | Pierce | |
| 6,998,361 B2 | 2/2006 | Lewis | |
| 7,022,634 B2 | 4/2006 | Hamilton et al. | |
| 7,189,671 B1 | 3/2007 | Lewis | |
| 7,259,118 B2 | 8/2007 | Jubb et al. | |
| 7,285,510 B2 | 10/2007 | Sakaguchi et al. | |
| 7,449,419 B2 | 11/2008 | Li | |
| 7,509,819 B2 | 3/2009 | Baker et al. | |
| 7,781,355 B2 | 8/2010 | Berthereau et al. | |
| 7,799,713 B2 * | 9/2010 | Hofmann et al. | 501/36 |
| 7,811,954 B2 | 10/2010 | Berthereau et al. | |
| 7,823,417 B2 * | 11/2010 | Hoffmann et al. | 65/335 |
| 2001/0011058 A1 | 8/2001 | Tamura | |
| 2002/0000101 A1 | 1/2002 | Chenoweth | |
| 2002/0045528 A1 | 4/2002 | Kusuno et al. | |
| 2003/0077178 A1 | 4/2003 | Stearns | |
| 2003/0100431 A1 | 5/2003 | Koyo et al. | |
| 2003/0166446 A1 | 9/2003 | Lewis | |
| 2003/0188554 A1 | 10/2003 | Baker et al. | |
| 2003/0207748 A1 | 11/2003 | Wallenberger | |
| 2003/0224922 A1 | 12/2003 | Wallenberger | |
| 2004/0092379 A1 | 5/2004 | Lewis | |
| 2004/0220038 A1 | 11/2004 | Wolff | |
| 2005/0009683 A1 | 1/2005 | Hamilton et al. | |
| 2005/0014624 A1 | 1/2005 | Jubb et al. | |
| 2005/0031703 A1 | 2/2005 | Beier et al. | |
| 2005/0084440 A1 | 4/2005 | Chacon et al. | |
| 2005/0085369 A1 | 4/2005 | Jesen | |
| 2005/0090377 A1 | 4/2005 | Shelestak et al. | |
| 2005/0107238 A1 | 5/2005 | Li | |
| 2005/0130825 A1 | 6/2005 | Kravchenko et al. | |
| 2005/0232828 A1 | 10/2005 | Merry | |
| 2005/0234216 A1 | 10/2005 | Klein et al. | |
| 2006/0001005 A1 | 1/2006 | Kishimoto et al. | |
| 2006/0003884 A1 | 1/2006 | Nishizawa et al. | |
| 2006/0257240 A1 | 11/2006 | Naskali et al. | |
| 2007/0087139 A1 | 4/2007 | Creux et al. | |
| 2007/0105701 A1 | 5/2007 | Hoffmann et al. | |
| 2007/0107220 A1 | 5/2007 | Bakhuis et al. | |
| 2008/0009403 A1 | 1/2008 | Hofmann et al. | |
| 2008/0053152 A1 | 3/2008 | Kurachi et al. | |
| 2008/0141721 A1 | 6/2008 | Adams et al. | |
| 2009/0286440 A1 * | 11/2009 | Lecomte et al. | 442/181 |
| 2010/0069220 A1 * | 3/2010 | McGinnis et al. | 501/32 |
| 2010/0093511 A1 | 4/2010 | Berthereau et al. | |
| 2010/0160140 A1 * | 6/2010 | McGinnis | 501/38 |
| 2010/0162772 A1 | 7/2010 | McGinnis | |
| 2011/0000263 A1 | 1/2011 | Hofmann | |
| 2011/0003678 A1 | 1/2011 | Hofmann | |

FOREIGN PATENT DOCUMENTS

| | | | |
|---|---|---|---|
| CN | 1113893 | 12/1995 | |
| CN | 1243501 | 2/2000 | |
| CN | 1392870 | 1/2003 | |
| CN | 1678654 | 10/2005 | |
| CN | 101580344 | 11/2009 | |
| CN | 101597140 | 12/2009 | |
| CN | 101691278 | 4/2010 | |
| CN | 101838110 | 9/2010 | |
| CN | 101549958 | 1/2011 | |
| DE | 1496520 | 8/1969 | |
| EP | 500325 | 8/1992 | |
| EP | 931774 A1 * | 7/1999 | |
| FR | 1357393 | 4/1964 | |
| FR | 1435073 | 4/1966 | |
| FR | 1534135 | 12/1968 | |
| FR | 1589410 | 3/1970 | |
| FR | 2223328 | 10/1974 | |
| FR | 2692248 | 12/1993 | |
| FR | 2856055 | 12/2004 | |
| FR | 2879591 | 6/2006 | |
| GB | 428 720 A | 5/1935 | |
| GB | 1006524 | 10/1965 | |
| GB | 1147718 | 4/1969 | |
| GB | 1209244 | 10/1970 | |
| GB | 1531287 | 11/1978 | |
| JP | 45-011228 | 5/1970 | |
| JP | 51-055308 | 5/1976 | |
| JP | 58 064243 A | 4/1983 | |
| JP | 58064243 A * | 4/1983 | |
| JP | 58-088138 | 5/1983 | |
| JP | 1-189985 | 7/1989 | |
| JP | 1-239039 | 9/1989 | |
| JP | 3-112650 | 5/1991 | |
| JP | 4-50144 | 2/1992 | |
| JP | 6-211543 | 8/1994 | |
| JP | 6-219780 | 8/1994 | |
| JP | 06305773 A * | 11/1994 | |
| JP | 7-010598 | 1/1995 | |
| JP | 8-231240 | 9/1996 | |
| JP | 2582361 | 2/1997 | |
| JP | 11-021147 | 1/1999 | |
| JP | 1997-176694 | 1/1999 | |
| JP | 2000-247677 | 9/2000 | |
| JP | 2000-247683 | 9/2000 | |
| JP | 2001-206733 | 7/2001 | |
| JP | 2001-316961 | 11/2001 | |
| JP | 2002-003237 | 1/2002 | |
| JP | 2002-060252 | 2/2002 | |
| JP | 2002-069941 | 3/2002 | |
| JP | 2002-081022 | 3/2002 | |
| JP | 2002-154843 | 5/2002 | |
| JP | 2002-293574 | 10/2002 | |
| JP | 2003137590 A * | 5/2003 | |
| JP | 2003-160350 | 6/2003 | |
| JP | 2003-171143 | 6/2003 | |
| JP | 2003-183031 | 7/2003 | |
| JP | 2003-239847 | 8/2003 | |
| JP | 2003-321247 | 11/2003 | |
| JP | 2004-091307 | 3/2004 | |
| WO | 99/31021 | 6/1999 | |
| WO | 02/20419 | 3/2002 | |
| WO | 02/42233 | 5/2002 | |
| WO | 2004/020506 | 3/2004 | |
| WO | WO 2004/094794 | 11/2004 | |
| WO | 2005/092808 | 10/2005 | |

| | | |
|---|---|---|
| WO | 2005/093227 | 10/2005 |
| WO | 2006/064164 | 6/2006 |
| WO | WO 2007/055964 | 5/2007 |
| WO | WO 2007/055968 | 5/2007 |
| WO | 2008/073585 | 6/2008 |
| WO | 2010/075258 | 7/2010 |
| WO | 2010/075262 | 7/2010 |
| WO | 2010/075267 | 7/2010 |

OTHER PUBLICATIONS

Office action from U.S. Appl. No. 12/403,955 dated Apr. 24, 2012.
Office action from U.S. Appl. No. 09/703,234 dated Apr. 15, 2002.
Office action from U.S. Appl. No. 09/703,234 dated Sep. 6, 2002.
Advisory action from U.S. Appl. No. 09/703,234 dated Nov. 19, 2002.
Office action from U.S. Appl. No. 09/703,234 dated Feb. 4, 2003.
Office action from U.S. Appl. No. 09/703,234 dated Jul. 11, 2003.
Advisory action from U.S. Appl. No. 09/703,234 dated Oct. 24, 2003.
Office action from U.S. Appl. No. 09/703,234 dated Dec. 16, 2003.
Notice of Allowance from U.S. Appl. No. 09/703,234 dated Jul. 6, 2004.
Office action from U.S. Appl. No. 10/560,068 dated Aug. 1, 2008.
Office action from U.S. Appl. No. 10/560,068 dated Dec. 15, 2008.
Advisory Action from U.S. Appl. No. 10/560,068 dated Feb. 25, 2009.
Office action from U.S. Appl. No. 10/560,068 dated May 7, 2009.
Office action from U.S. Appl. No. 10/560,068 dated Nov. 5, 2009.
Advisory Action from U.S. Appl. No. 10/560,068 dated Mar. 16, 2010.
Panel Decision of Pre-Appeal Brief from U.S. Appl. No. 10/560,068 dated Apr. 29, 2010.
Examiner's Answer from U.S. Appl. No. 10/560,068 dated Aug. 3, 2010.
Notice of Allowance from U.S. Appl. No. 11/267,702 dated Jul. 29, 2009.
Office action from U.S. Appl. No. 11/267,702 dated Dec. 3, 2009.
Notice of Allowance from U.S. Appl. No. 11/267,702 dated Jun. 16, 2010.
Notice of Allowance from U.S. Appl. No. 11/267,739 dated Jul. 13, 2009.
Office action from U.S. Appl. No. 11/267,739 dated Dec. 3, 2009.
Notice of Allowance from U.S. Appl. No. 11/267,739 dated Apr. 7, 2010.
Office action from U.S. Appl. No. 11/722,039 dated Oct. 28, 2009.
Office action from U.S. Appl. No. 11/722,039 dated Jun. 22, 2010.
Interview Summary from U.S. Appl. No. 11/722,039 dated Sep. 21, 2010.
Office action from U.S. Appl. No. 11/722,039 dated Oct. 19, 2010.
Office action from U.S. Appl. No. 11/722,039 dated Jun. 7, 2011.
Office action from U.S. Appl. No. 12/344,130 dated Nov. 17, 2010.
Office action from U.S. Appl. No. 12/344,130 dated Apr. 20, 2011.
Notice of Allowance from U.S. Appl. No. 12/344,130 dated Oct. 11, 2011.
Office action from U.S. Appl. No. 12/847,206 dated Feb. 22, 2011.
Office action from U.S. Appl. No. 12/847,206 dated Oct. 14, 2011.
Office action from U.S. Appl. No. 12/880,289 dated Jul. 20, 2011.
Notice of Allowance from U.S. Appl. No. 12/880,289 dated Dec. 22, 2011.
International Search Report from PCT/FR04/01431 dated Jun. 11, 2003.
International Search Report from PCT/FR05/51090 date Mar. 23, 2006.
International Search Report and Written Opinion from PCT/US09/68949 dated May 7, 2010.
International Search Report and Written Opinion from PCT/US09/68955 dated May 7, 2010.
International Search Report and Written Opinion from PCT/US09/68965 dated May 7, 2010.
Office action from Australian Application No. 2006312015 dated May 5, 2011.
Office action from Australian Application No. 2006312106 dated May 5, 2011.
Office action from Chinese Application No. 200680041104.0 dated Aug. 4, 2010.
Office action from Chinese Application No. 200680041104.0 dated Mar. 22, 2011.
Office action from Chinese Application No. 200680041104.0 dated Jul. 14, 2011.
Communication fom EP application No. 06827125.3 dated Jun. 4, 2009 which incudes the EP OA fom Feb. 13, 2009 and the Search Report dated Dec. 10, 2008.
Office action from Indian Application No. 2108/KOLNP/2007 dated Jun. 28, 2011.
Office action from Japanese Application No. 2007-546144 dated Sep. 13, 2011.
Office action from Mexican Application No. 08/005819 dated Mar. 16, 2011.
Office action from Mexican Application No. 08/005819 dated Jun. 3, 2011.
Office action from Russian Application No. 2008117091 dated Apr. 19, 2010.
Office action from Russian Application No. 2008117091 dated Dec. 13, 2010.
Office action from Russian Application No. 2008117092 dated Oct. 12, 2011.
Aslanova, "Steklyannye volokna", Glass Fibers, Moscow, Khimiya, 1979, I, 256 pp. pp. 33, 34, Fig. 3.2).
Chernyak et alo. "Nepreryvnoe steklyannoe volokno" Continuous Glass Fiber, Moscow, Khimiya, 1965.
Fredell, "Fiber metal laminates for improved structural integrity", 1992, conference paper.
Joosee, "Literature search of mechanical properties of fiber-reinforced plastics for wind turbine rotors", Dec. 1988 English abstract included.
Popov, et al., "Proizvodstvo i primenenie plavlenolitykh ogneuporov", Manufacture and Application of Molten Cast Materials, Moscow, Metallurgiya, 1985, IV, p. 212-213.
Office action from U.S. Appl. No. 11/722,039 dated Mar. 1, 2010.
Office action from U.S. Appl. No. 12/403,955 dated Dec. 9, 2011.
Office action from Brazilian Application No. PI01149733 dated Mar. 10, 2009.
Office action from Canadian Application No. 2,528,923 dated Dec. 9, 2010 along with English translation of relevant portions of action.
Office action from Canadian Application No. 2,528,923 dated Jul. 12, 2011.
Office action from Chinese Application No. 200480015986.4 dated Jul. 6, 2007.
Office action from Chinese Application No. 200580043075.7 dated Feb. 5, 2010.
Office action from Chinese Application No. 200580043075.7 dated Dec. 7, 2011.
Office action from Chinese Application No. 200680041114.4 dated Feb. 29, 2012.
Office action from European Application No. 01987549.1 dated Aug. 5, 2011.
Office action from European Application No. 04767297.7 dated Sep. 8, 2006.
Office action from European Application No. 05825565.4 dated Dec. 14, 2007.
Office action from European Application No. 05825565.4 dated Nov. 19, 2010.
Office action from European Application No. 05825565.4 dated May 9, 2011.
Office action from European Application No. 05825565.4 dated Mar. 31, 2011.
Search Report from French Registration No. 635569 (FR 0306981) dated Feb. 13, 2004.
Search Report from French Registration No. 658923 (FR 0413443) dated Aug. 16, 2005.
Office action from Indian Application No. 00501/KOLNP/2003 dated Jul. 7, 2006.
Office action from Indian Application No. 00501/KOLNP/2003 dated May 14, 2007.
Office action from Indian Application No. 2546/KOLNP/2005 dated Jun. 15, 2007.
Office action from Japanese Application No. 2002-544374 dated Sep. 28, 2007.

Office action from Japanese Application No. 2002-544374 dated Jul. 27, 2009.
Office action from Japanese Application No. 2002-544374 dated Jul. 12, 2010.
Office action from Japanese Application No. 2006-516274 dated Jun. 22, 2010.
Office action from Japanese Application No. 2006-516274 dated Feb. 22, 2011.
Office action from Korean Application No. 2003-7005873 dated Jun. 26, 2007.
Office action from Korean Application No. 2003-7005873 dated Nov. 29, 2007.
Office action from Korean Application No. 10-2005-7023679 dated Mar. 3, 2011.
Office action from Mexican Application No. PA/a/2002/000814 dated Feb. 22, 2006.
Office action from Mexican Application No. PA/a/2002/00814 dated Sep. 9, 2005.
Office action from Mexican Application No. PA/a/2002/00814 dated Jun. 23, 2005.
Office action from Mexican Application No. PA/a/2002/00814 dated Sep. 26, 2002.
Office action from Mexican Application No. 05/013323 dated Feb. 27, 2006.
Office action from Mexican Application No. 05/013323 dated May 29, 2009.
Office action from Mexican Application No. 07/06989 dated Aug. 22, 2007.
Office action from Mexican Application No. 07/006989 dated Oct. 24, 2011.
Communication regarding Mexican Application No. 08/05816 dated Mar. 15, 2011.
Office action from Russian Application No. 2007126843 dated Sep. 24, 2009.
Office action from Russian Application No. 2007126843 dated Dec. 11, 2009.
Office action from Canadian Application No. 2,426,637 dated Aug. 28, 2008.
Office action from Russian Application No. 2006100296/03 dated Jun. 8, 2008.
Office action from Russian Application No. 2006100296/03 dated Nov. 26, 2008.
Office action from Taiwanese Application No. 094144552 dated May 16, 2012.
Notice of Allowance from U.S. Appl. No. 12/344,130 dated Jun. 7, 2012.
Office action from Russian Application No. 2008117092/03 dated May 17, 2012.
Office action from Chinese Application No. 200680041104.0 dated Jun. 13, 2012.
Office action from U.S. Appl. No. 11/699,719 dated Jul. 2, 2012.
Office action from Canadian Application No. 2,591,026 dated May 15, 2012 along with English translation of relevant portions of action.
English Translation of JP Patent No. 2002-154843. Foreign patent along with English abstract previously submitted.
Office action from Mexican Application No. 07/06989 dated Jun. 26, 2012.
Office action from Japanese Application No. 2008-540053 dated Jul. 30, 2012.
Office action from Japanese Application No. 2008-540052 dated Jul. 30, 2012.
Office action from Korean Application No. 10-2007-70126026 dated Aug. 9, 2012.
Office action from U.S. Appl. No. 12/643,411 dated Aug. 17, 2012.
Office action from U.S. Appl. No. 11/722,039 dated Aug. 24, 2012.
Lund, "Tensile strength of glass fibres", dated Feb. 18, 2010.
Office action from Chinese Application No. 200680041104.0 dated Sep. 13, 2012.
Notice of Allowance from U.S. Appl. No. 12/880,289 dated Aug. 31, 2012.
Office action from Japanese Application No. 2009-533917 dated Sep. 24, 2012.
Appeal Decision from U.S. Appl. No. 10/560,068 dated Aug. 15, 2012.
Office action from Canadian Application No. 2,626,733 dated Oct. 9, 2012.
Office action from European Application No. 09796243.5 dated Oct. 2, 2012.

* cited by examiner

COMPOSITION FOR HIGH PERFORMANCE GLASS FIBERS AND FIBERS FORMED THEREWITH

TECHNICAL FIELD AND INDUSTRIAL APPLICABILITY OF THE INVENTION

The present invention is generally directed to a composition for use in manufacturing continuous high strength glass fibers and fibers formed from the composition.

BACKGROUND OF THE INVENTION

A common glass composition for making continuous high-strength glass fiber strands is "S-Glass." The term S-Glass defines a family of glasses composed primarily of the oxides of magnesium, aluminum, and silicon with a chemical composition that produces glass fibers having a higher mechanical strength than E-Glass fibers. The chemical composition of the S-glass family produces high strength glass fiber and enables these glasses to be used in high strength applications such as ballistic armor. ASTM International defines S-Glass as family of glasses composed primarily of the oxides of magnesium, aluminum, and silicon with a certified chemical composition which conforms to an applicable material specification and which produces high mechanical strength (D578-05). The Deutsches Institut für Normung (DIN) defines S-Glass as an aluminosilicate glass without added CaO and having a partial mass of MgO where MgO is about 10% by weight (An alumino-silicate glass is defined as a glass which consists largely of aluminum trioxide and silicon dioxide and other oxides) (DIN 1259-1).

R-Glass is another family of high strength, high modulus glasses that is typically formed into fibers for use in aerospace composite applications. The R-Glass family is primarily composed of silicon oxide, aluminum oxide, magnesium oxide, and calcium oxide with a chemical composition that produces glass fibers with a higher mechanical strength than S-Glass fibers. R-Glass generally contains less silica and greater calcium oxide (CaO) than S-Glass which requires higher melting and processing temperatures during fiber forming.

Tables IA-IE set forth the compositions for a number of conventional high strength glass compositions.

TABLE I-A

| Constituent | Chinese High Strength glass | RUSSIAN CONTINUOUS ROVING MAGNESIUM ALUMINOSILICATE | NITTOBO "T" Glass Fabric "B" | NITTOBO "T" Glass Fabric (Yarn) "C" |
|---|---|---|---|---|
| $SiO_2$ | 55.08 | 55.81 | 64.58 | 64.64 |
| CaO | 0.33 | 0.38 | 0.44 | 0.40 |
| $Al_2O_3$ | 25.22 | 23.78 | 24.44 | 24.57 |
| $B_2O_3$ | 1.85 | | 0.03 | 0.03 |
| MgO | 15.96 | 15.08 | 9.95 | 9.92 |
| $Na_2O$ | 0.12 | 0.063 | 0.08 | 0.09 |
| Fluorine | 0.03 | | 0.034 | 0.037 |
| $TiO_2$ | 0.023 | 2.33 | 0.019 | 0.018 |
| $Fe_2O_3$ | 1.1 | 0.388 | 0.187 | 0.180 |
| $K_2O$ | 0.039 | 0.56 | 0.007 | 0.010 |
| $ZrO_2$ | 0.007 | 0.15 | | |
| $Cr_2O_3$ | | 0.011 | 0.003 | 0.003 |
| $Li_2O$ | | 1.63 | | |
| $CeO_2$ | | | | |

TABLE I-B

| Constituent | Nitto Boseki A&P Yarn | Nitto Boseki NT6030 Yarn | Nitto Boseki TE Glass RST-220PA-535CS | Vetrotex Saint Gobain SR Glass Stratifils SR CG 250 P109 | Polotsk STEKLOVOLOKNO High Strength Glass |
|---|---|---|---|---|---|
| $SiO_2$ | 65.51 | 64.60 | 64.20 | 63.90 | 58.64 |
| CaO | 0.44 | 0.58 | 0.63 | 0.26 | 0.61 |
| $Al_2O_3$ | 24.06 | 24.60 | 25.10 | 24.40 | 25.41 |
| $B_2O_3$ | | | | | 0.04 |
| MgO | 9.73 | 9.90 | 9.90 | 10.00 | 14.18 |
| $Na_2O$ | 0.04 | 0.06 | 0.020 | 0.039 | 0.05 |
| Fluorine | 0.07 | | | | 0.02 |
| $TiO_2$ | 0.016 | 0.000 | 0.000 | 0.210 | 0.624 |
| $Fe_2O_3$ | 0.067 | 0.079 | 0.083 | 0.520 | 0.253 |
| $K_2O$ | 0.020 | 0.020 | 0.020 | 0.540 | 0.35 |
| $ZrO_2$ | 0.079 | | | | |
| $Cr_2O_3$ | 0.0010 | | | 0.001 | 0.023 |
| $Li_2O$ | | | | | |
| $CeO_2$ | | | | | |

TABLE I-C

| Constituent | Chinese High Strength Yarn (8 micron) | Chinese High Strength Glass Roving | Advanced Glass Yarns Zentron S-2 Glass Roving | SOLAIS Glass Sample |
|---|---|---|---|---|
| $SiO_2$ | 55.22 | 55.49 | 64.74 | 64.81 |
| CaO | 0.73 | 0.29 | 0.14 | 0.55 |
| $Al_2O_3$ | 24.42 | 24.88 | 24.70 | 24.51 |
| $B_2O_3$ | 3.46 | 3.52 | | 0.02 |
| MgO | 12.46 | 12.28 | 10.24 | 9.35 |
| $Na_2O$ | 0.104 | 0.06 | 0.17 | 0.16 |
| Fluorine | 0.07 | | | 0.02 |
| $TiO_2$ | 0.32 | 0.36 | 0.015 | 0.04 |
| $Fe_2O_3$ | 0.980 | 0.930 | 0.045 | 0.238 |
| $K_2O$ | 0.240 | 0.150 | 0.005 | 0.03 |
| $ZrO_2$ | | | | |
| $Cr_2O_3$ | 0.0050 | | | 0.007 |
| $Li_2O$ | 0.59 | 0.63 | | |
| $CeO_2$ | 1.23 | 1.25 | | |

TABLE I-D

| Constituent | Advanced Glass Yarns S Glass | Culimeta Roving | IVG Vertex B96 675 Yarn | IVG Vertex Glass Roving | IVG Vertex Outside #1 Glass Roving |
|---|---|---|---|---|---|
| $SiO_2$ | 64.61 | 59.37 | 58.34 | 58.58 | 58.12 |
| CaO | 0.17 | 0.27 | 0.31 | 0.30 | 0.31 |
| $Al_2O_3$ | 24.84 | 25.49 | 23.81 | 24.26 | 24.09 |
| $B_2O_3$ | 0.04 | 0.05 | | | |
| MgO | 10.11 | 13.47 | 14.99 | 15.02 | 15.36 |
| $Na_2O$ | 0.118 | 0.024 | 0.05 | 0.02 | 0.03 |
| Fluorine | 0.03 | | 0.04 | 0.04 | 0.04 |
| $TiO_2$ | 0.011 | 0.530 | 1.380 | 0.67 | 0.91 |
| $Fe_2O_3$ | 0.042 | 0.374 | 0.333 | 0.336 | 0.303 |
| $K_2O$ | | 0.48 | 0.42 | 0.28 | 0.29 |
| $ZrO_2$ | | 0.152 | 0.129 | 0.165 | 0.157 |
| $Cr_2O_3$ | 0.0050 | 0.0120 | 0.0100 | 0.0120 | 0.0120 |
| $Li_2O$ | | | | | |
| $CeO_2$ | | | | | |

TABLE I-E

| Constituent | IVG Vertex Outside #2 Glass Roving | RH CG250 P109 Glass Fiber Strand |
|---|---|---|
| $SiO_2$ | 58.69 | 58.54 |
| CaO | 0.29 | 9.35 |
| $Al_2O_3$ | 24.3 | 25.39 |
| $B_2O_3$ | | |
| MgO | 15.06 | 6.15 |
| $Na_2O$ | 0.03 | 0.10 |
| Fluorine | 0.04 | 0.16 |
| $TiO_2$ | 0.64 | 0.008 |
| $Fe_2O_3$ | 0.331 | 0.069 |
| $K_2O$ | 0.36 | 0.14 |
| $ZrO_2$ | 0.187 | 0.006 |
| $Cr_2O_3$ | 0.0130 | |
| $Li_2O$ | | |
| $CeO_2$ | | |

Typical R-Glass and S-Glass are generally produced by melting the constituents of the compositions in a platinum lined melting container. The costs of forming R-Glass and S-Glass fibers are dramatically higher than E-Glass fibers due to the cost of producing the fibers in such melters. Thus, there is a need in the art for methods of forming glass compositions useful in the formation of high performance glass fibers in a more cost-effective process.

SUMMARY OF THE INVENTION

The present invention is a glass composition for the formation of continuous glass fibers suitable for use in high strength applications. The composition may be inexpensively formed into glass fibers using low-cost, direct melting in refractory-lined furnaces due to the relatively low fiberizing temperature of the composition. Once formed into fibers, the glass composition provides the strength characteristics of S-Glass. One composition of the present invention includes 64-75 weight % $SiO_2$, 16-24 weight % $Al_2O_3$, 8-11 weight % MgO and 0.25 to 3.0 weight % $R_2O$ where $R_2O$ is the sum of $Li_2O$ and $Na_2O$. The composition of the present invention includes 64-75 weight % $SiO_2$, 16-24 weight % $Al_2O_3$, 8-11 weight % MgO and 0.25 to 3.0 weight % $Li_2O$. In certain embodiments, the glass composition is composed of 64-70 weight % $SiO_2$, 17-22 weight % $Al_2O_3$, 9-11 weight % MgO and 1.75-3.0 weight % $R_2O$ where $R_2O$ is the sum of $Li_2O$ and $Na_2O$. In another embodiment, the glass composition is composed of 64-70 weight % $SiO_2$, 17-22 weight % $Al_2O_3$, 9-11 weight % MgO and 1.75-3.0 weight % $LiO_2$. In certain embodiments, the composition does not contain more than about 5.0 weight % of oxides or compounds selected from the group consisting of CaO, $P_2O_5$, ZnO, $ZrO_2$, SrO, BaO, $SO_3$, $F_2$, $B_2O_3$, $TiO_2$ and $Fe_2O_3$.

The desired properties of the high performance composite fibers manufactured by the present invention include a fiberizing temperature of less than about 2650° F., less than about 2625° F., less than about 2600° F., or even less than about 2575° F. and a liquidus temperature that is below the fiberizing temperature, in some instances by at least 80° F., in others by at least about 120° F., and in certain other instances by at least about 150° F. The present invention also includes fibers formed from such a composition.

DETAILED DESCRIPTION AND PREFERRED EMBODIMENTS OF THE INVENTION

The fiberizing properties of the glass batch composition of the present invention include the fiberizing temperature, the liquidus, and delta-T ($\Delta T$). The fiberizing temperature is defined as the temperature that corresponds to a viscosity of 1000 Poise. As discussed in more detail below, a lowered fiberizing temperature reduces the production cost of the fibers, allows for a longer bushing life, increases throughput permits the glass to be melted in a refractory-lined melter, and reduces energy consumption. For example, at a lower fiberizing temperature, a bushing operates at a cooler temperature and does not "sag" as quickly. Sag is a phenomenon that occurs in bushings that are held at an elevated temperature for extended periods of time. By lowering the fiberizing temperature, the sag rate of the bushing may be reduced and the bushing life can be increased. In addition, a lower fiberizing temperature allows for a higher throughput since more glass can be melted in a given period at a given energy input. As a result, production cost is reduced. In addition, a lower fiberizing temperature will also permit glass formed with the inventive composition to be melted in a refractory-lined melter since both its melting and fiberizing temperatures are below the upper use temperatures of many commercially available refractories.

The liquidus of a glass is defined as the highest temperature at which equilibrium exists between liquid glass and its primary crystalline phase. At all temperatures above the liquidus, the glass is free from crystals in its primary phase. At temperatures below the liquidus, crystals may form. Crystals in the melt will cause blockages in the bushing and weakness in the fibers.

Another fiberizing property is delta-T ($\Delta T$), which is defined as the difference between the fiberizing temperature and the liquidus. A larger $\Delta T$ offers a greater degree of flexibility during the formation of the glass fibers and helps to inhibit devitrification of the glass (that is, the formation of crystals within the melt) during melting and fiberizing. Increasing the $\Delta T$ also reduces the production cost of the glass fibers by allowing for a greater bushing life and by providing a wider process window for forming fibers.

The glasses of the present invention are suitable for melting in traditional commercially available refractory-lined glass melters that are widely used in the manufacture of glass reinforcement fibers, in what is commonly called a direct-melt process. This is contrasted to prior art formulations, which were melted in a platinum lined melting container, since those prior art formulations typically do not have properties which are compatible with direct-melt processes. With the present invention, starting batch components typically include $SiO_2$ (ground silica sand), and $Al_2O_3$ (calcined alumina) or pyrophyllite, as well as chain modifiers from source materials such as talc, magnesite or dolomite. The carbon included in materials such as magnesite is off gassed as oxides of carbon such as $CO_2$.

In certain embodiments, a fiber formed in accordance with the present invention will include 64-75 weight % $SiO_2$, 16-24 weight % $Al_2O_3$, 8-11 weight % MgO and 0.25 to 3.0 weight % $R_2O$ where $R_2O$ is the sum of $Li_2O$ and $Na_2O$. In other embodiments, the composition will include 0.25 to 3.0 weight % $Li_2O$ rather than a combination of $Li_2O$ and $Na_2O$. In yet other embodiments, the glass composition is composed of 64-70 weight % $SiO_2$, 17-22 weight % $Al_2O_3$, 9-11 weight % MgO and 1.75 to 3.0 weight % $R_2O$ where $R_2O$ is the sum of $Li_2O$ and $Na_2O$. In certain other embodiments, the composition will include 1.75 to 3.0 weight % $LiO_2$. A fiber formed in accordance with the present invention will typically include small amounts of CaO, $P_2O_5$, ZnO, $ZrO_2$, SrO, BaO, $SO_3$, $F_2$, $B_2O_3$, $TiO_2$ and $Fe_2O_3$, in certain embodiments in a total amount of less than 5 weight percent, and in other embodiments less than about 4 weight percent. In addition, a fiber formed in accordance with the method and composition of the present invention will having a fiberizing temperature of less than 2650° F., and in certain embodiments less than about 2625° F., in other embodiments less than about 2600° F. and in certain embodiments less than about 2575° F. and a liquidus temperature that is below the fiberizing temperature in certain embodiments by at least 80° F., and in other embodiments by at least about 120° F., and in yet other embodiments by at least about 150° F. Further, the glass of the present invention in certain embodiments will have a pristine fiber strength in excess of 680 KPSI, and in certain other embodiments a strength in excess of about 700 KPSI, and in yet other embodiments a strength in excess of about 730 KPSI. Further, the glass fibers will desirably have a modulus greater than 12.0 MPSI, and in certain embodiments greater than about 12.18 MPSI, and in some embodiments greater than about 12.6 MPSI.

The glass batch of the present invention is melted, in some instances using a glass melting furnace made from appropriate refractory materials such as alumina, chromic oxide, silica, alumina-silica, zircon, zirconia-alumina-silica, or similar oxide-based refractory materials. Often, such glass melting furnaces include one more bubblers and/or electrical boost electrodes (One suitable glass melting furnace is disclosed in U.S. Application Number 20070105701 entitled "Method of Manufacturing High Performance Glass Fibers in a Refractory Lined Melter and Fiber Formed Thereby" herein incorporated by reference). The bubblers and/or electrical boost electrodes increase the temperature of the bulk glass and increase the molten glass circulation under the batch cover.

The melted glass is delivered to a bushing assembly from a forehearth. The bushing includes a tip plate with a plurality of nozzles, each nozzle discharges a stream of molten glass, which are mechanically drawn to form continuous filaments. Typically, the filaments are coated with a protective sizing, gathered into a single continuous strand and wound onto a rotating collet of a winder device to form a package. The filaments may also be processed into other forms including, without limitation, wet used chopped strand fibers, dry use chopped strand fibers, continuous filament mats, chopped strand mats, wet formed mats or air laid mats.

Having generally described this invention, a further understanding can be obtained by reference to certain specific examples illustrated below which are provided for purposes of illustration only and are not intended to be all inclusive or limiting unless otherwise specified.

EXAMPLES

The glasses in the examples listed in Tables IIA-IID were melted in platinum crucibles or in a continuous platinum-lined melter for determining the mechanical and physical properties of the glass and fibers produced therefrom. The units of measurement for the physical properties are: Viscosity (° F.), Liquidus temperature (° F.) and ΔT (° F.). In some examples the glasses were fiberized and Strength (KPsi), Density (g/cc), Modulus (MPsi) were measured.

The fiberizing temperature was measured using a rotating spindle viscometer. The fiberizing viscosity is defined as 1000 Poise. The liquidus was measured by placing a platinum container filled with glass in a thermal gradient furnace for 16 hours. The greatest temperature at which crystals were present was considered the liquidus temperature. The modulus was measured using the sonic technique on a single fiber of glass. The tensile strength was measured on a pristine single fiber.

TABLE IIA

| Glass | Ex. 1 | Ex. 2 | Ex. 3 | Ex. 4 | Ex. 5 | Ex. 6 |
|---|---|---|---|---|---|---|
| $SiO_2$ | 67.2 | 69 | 67 | 70 | 70 | 65 |
| $Al_2O_3$ | 20 | 22 | 22 | 17 | 17 | 21 |
| MgO | 9.8 | 9 | 11 | 11 | 10 | 11 |
| $Li_2O$ | 3 | 0 | 0 | 2 | 3 | 3 |
| Measured Viscosity (° F.) | 2531 | 2761 | 2648 | 2557 | 2558 | 2461 |
| 1$^{st}$ Measured Liquidus (° F.) | 2313 | 2619 | 2597 | 2332 | 2302 | 2296 |
| 2$^{nd}$ Measured Liquidus (° F.) | 2302 | 2620 | 2614 | 2346 | 2308 | 2318 |
| ΔT (° F.) | 218 | 142 | 51 | 225 | 256 | 165 |
| Measured Density (g/cc) | 2.459 | 2.452 | 2.481 | 2.450 | 2.441 | 2.482 |

TABLE II-B

| Glass | Ex. 7 | Ex. 8 | Ex. 9 | Ex. 10 | Ex. 11 | Ex. 12 |
|---|---|---|---|---|---|---|
| $SiO_2$ | 70 | 69 | 70 | 65 | 66 | 65 |
| $Al_2O_3$ | 18 | 17 | 21 | 22 | 22 | 22 |
| MgO | 9 | 11 | 9 | 11 | 9 | 10 |
| $Li_2O$ | 3 | 3 | 0 | 2 | 3 | 3 |
| Measured Viscosity (° F.) | 2544 | 2496 | 2752 | 2525 | 2523 | 2486 |
| $1^{st}$ Measured Liquidus (° F.) | 2311 | 2234 | 2597 | 2468 | 2391 | 2361 |
| $2^{nd}$ Measured Liquidus (° F.) | 2324 | 2343 | 2603 | 2462 | 2394 | 2382 |
| ΔT (° F.) | 233 | 262 | 155 | 57 | 132 | 125 |
| Measured Density (g/cc) | 2.434 | 2.455 | 2.443 | 2.486 | 2.460 | 2.474 |

TABLE II-C

| Glass | Ex. 13 | Ex. 14 | Ex. 15 | Ex. 16 | Ex. 17 | Ex. 18 |
|---|---|---|---|---|---|---|
| $SiO_2$ | 70 | 67.32 | 67.57 | 68.27 | 68.02 | 67.76 |
| $Al_2O_3$ | 19 | 20.49 | 20.49 | 20.10 | 20.10 | 20.10 |
| MgO | 11 | 10.00 | 10.00 | 9.69 | 9.69 | 9.69 |
| $Li_2O$ | 0 | 2.00 | 1.75 | 1.75 | 2.00 | 2.25 |
| Measured Viscosity (° F.) | 2679 | 2563 | 2584 | 2598 | 2578 | 2547 |
| $1^{st}$ Measured Liquidus (° F.) | 2596 | 2456 | 2486 | 2446 | 2431 | 2399 |
| $2^{nd}$ Measured Liquidus (° F.) | 2582 | 2447 | 2469 | 2469 | 2437 | 2406 |
| ΔT (° F.) | 83 | 111.5 | 106.5 | 140.5 | 144 | 144.5 |
| Measured Density (g/cc) | 2.453 | | 2.461 | | 2.452 | |

The composition of the present invention may also include chain modifiers such as $Na_2O$, CaO and $B_2O_3$. Such compositions are shown in Table II-D (below).

TABLE II-D

| Glass | Ex. 19 | Ex. 21 | Ex. 22 | Ex. 22 | Ex. 23 | Ex. 24 |
|---|---|---|---|---|---|---|
| $SiO_2$ | 75 | 66 | 65 | 65 | 66 | 74 |
| $Al_2O_3$ | 15 | 20 | 20 | 24 | 19 | 15 |
| MgO | 8 | 9 | 8 | 8 | 9 | 8 |
| $Li_2O$ | 1 | 1 | 2 | 0 | 0 | 0 |
| $Na_2O$ | 1 | 2 | 1 | 1 | 2 | 3 |
| CaO | | 2 | 4 | | | |
| $B_2O_3$ | | | | | 2 | 4 |
| Measured Viscosity (° F.) | 2765 | 2607 | 2469 | 2669 | | 2809 |
| $1^{st}$ Measured Liquidus (° F.) | 2422 | 2729 | | 2614 | 2630 | 2680 |
| ΔT (° F.) | 343 | −122 | | 55 | | 129 |

The fibers of the present invention have superior modulus and strength characteristics. The fibers of Example 1 have a Measured Modulus of 12.71 MPsi and a Measured Strength of 688 KPsi. The fibers of Example 3 have a Measured Modulus of 12.96 MPsi and a Measured Strength of 737 KPsi. The fibers of Example 17 have a Measured Modulus of 12.75 MPsi and a Measured Strength of 734 KPsi.

As is understood in the art, the above exemplary inventive compositions do not always total 100% of the listed components due to statistical conventions (such as, rounding and averaging) and the fact that some compositions may include impurities that are not listed. Of course, the actual amounts of all components, including any impurities, in a composition always total 100%. Furthermore, it should be understood that where small quantities of components are specified in the compositions, for example, quantities on the order of about 0.05 weight percent or less, those components may be present in the form of trace impurities present in the raw materials, rather than intentionally added.

Additionally, components may be added to the batch composition, for example, to facilitate processing, that are later eliminated, thereby forming a glass composition that is essentially free of such components. Thus, for instance, minute quantities of components such as fluorine and sulfate may be present as trace impurities in the raw materials providing the silica, calcia, alumina, and magnesia components in commercial practice of the invention or they may be processing aids that are essentially removed during manufacture.

As apparent from the above examples, glass fiber compositions of the invention have advantageous properties, such as low fiberizing temperatures and wide differences between the liquidus temperatures and the fiberizing temperatures (high ΔT values). Other advantages and obvious modifications of the invention will be apparent to the artisan from the above description and further through practice of the invention). The high-performance glass of the present invention melts and refines at relatively low temperatures, has a workable viscosity over a wide range of relatively low temperatures, and a low liquidus temperature range.

The invention of this application has been described above both generically and with regard to specific embodiments. Although the invention has been set forth in what is believed to be the preferred embodiments, a wide variety of alternatives known to those of skill in the art can be selected within the generic disclosure. Other advantages and obvious modifications of the invention will be apparent to the artisan from the above description and further through practice of the invention. The invention is not otherwise limited, except for the recitation of the claims set forth below.

We claim:

1. A composition for high strength glass fibers comprising:
   64-75 weight percent $SiO_2$;
   16-24 weight percent $Al_2O_3$;
   8-11 weight percent MgO;
   0.25-3 weight percent $Li_2O$; and
   no more than 1.0 weight percent of CaO impurities, wherein said glass fibers produced from said composition have a fiberizing temperature of less than about 2650° F. and a strength of greater than about 700 KPsi.

2. The composition of claim 1, wherein the composition further comprises less than 5 weight percent total of one or more compounds selected from the group consisting of $P_2O_5$, ZnO, $ZrO_2$, SrO, BaO, $SO_3$, $F_2$, $B_2O_3$, $TiO_2$ and $Fe_2O_3$.

3. The composition of claim 1, wherein glass fibers produced from said composition have a ΔT of at least 80° F.

4. The composition of claim 1, wherein:
   said $Al_2O_3$ is present in said composition in an amount from about 17 to about 22 weight percent;
   said MgO is present in said composition in an amount from about 9 to about 11 weight percent; and
   said $Li_2O$ is present in said composition in an amount from about 1.75 to 3.0 weight percent.

5. The composition of claim 1, wherein the components of said composition are meltable in a refractory-lined melter.

6. A high strength glass fiber formed from a composition comprising:
   64-75 weight percent $SiO_2$;
   16-24 weight percent $Al_2O_3$;
   8-11 weight percent MgO;
   0.25-3 weight percent $Li_2O$, and
   no more than 1.0 weight percent of CaO impurities, wherein said glass fiber has a fiberizing temperature of less than about 2650° F. and a strength of greater than about 700 KPsi.

7. The high strength glass fiber of claim 6, wherein the fiber has a modulus greater than about 12.0 MPsi.

8. The high strength glass fiber of claim 6, wherein said fiber has a pristine fiber tensile strength greater than about 730 KPsi.

9. The high strength glass fiber of claim 6, wherein said fiber has a fiberizing temperature less than about 2600° F.

10. The high strength glass fiber of claim 9, wherein said fiber has a liquidus temperature that is at least 80° F. below said fiberizing temperature.

11. The high strength glass fiber of claim 6, wherein said fiber has a ΔT of at least 80° F.

12. The high strength glass fiber of claim 6, wherein said fiber has a liquidus temperature that at least 80° F. below the fiberizing temperature.

13. The composition of claim 6, wherein $Li_2O$ is present in said composition in an amount from about 1.75 to 3.0 weight percent.

14. A glass fiber formed composition comprising:
    64-75 weight percent $SiO_2$;
    16-24 weight percent $Al_2O_3$;
    8-11 weight percent MgO;
    0.25-3 weight percent $Li_2O$; and
    no more than 1.0 weight percent of CaO impurities, wherein said glass fibers produced from said composition have a fiberizing temperature of less than about 2650° F., a modulus of greater than 12 MPsi, and a strength of greater than about 700 KPsi.

15. The high strength glass fiber of claim 14, wherein said fiber has a liquidus temperature that is at least 80° F. below the fiberizing temperature.

16. The high strength glass fiber of claim 14, wherein said fiber has a fiberizing temperature less than about 2600° F.

17. The glass fiber of claim 16, wherein said fiber has a liquidus temperature that is at least 80° F. below said fiberizing temperature.

18. The glass fiber of claim 14, wherein said fiber has a pristine fiber tensile strength greater than about 730 KPsi.

19. The glass fiber of claim 14, wherein said fiber has a ΔT of at least 80° F.

20. The glass fiber of claim 14, wherein:
    said $Al_2O_3$ is present in said composition in an amount from about 17 to about 22 weight percent;
    said MgO is present in said composition in an amount from about 9 to about 11 weight percent; and
    said $Li_2O$ is present in said composition in an amount from about 1.75 to 3.0 weight percent.

* * * * *